United States Patent
Schneider et al.

(10) Patent No.: US 7,406,520 B2
(45) Date of Patent: Jul. 29, 2008

(54) IDENTIFYING INTERFACES RELATED TO A SERVICE

(75) Inventors: Manfred Schneider, Nussioch (DE); Eugene Sindambiwe, Eppelheim (DE)

(73) Assignee: SAP Aktiengesellschaft, Walldorf (DE)

( * ) Notice: Subject to any disclaimer, the term of this patent is extended or adjusted under 35 U.S.C. 154(b) by 741 days.

(21) Appl. No.: 10/903,498

(22) Filed: Jul. 30, 2004

(65) Prior Publication Data

US 2006/0023857 A1    Feb. 2, 2006

(51) Int. Cl.
*G06F 15/173* (2006.01)

(52) U.S. Cl. .................. 709/225; 709/217; 709/218; 709/226; 709/246

(58) Field of Classification Search .............. 709/217, 709/218, 225, 226, 246
See application file for complete search history.

(56) References Cited

U.S. PATENT DOCUMENTS

| 7,072,953 | B1 * | 7/2006 | Davutoglu | 709/223 |
| 7,181,521 | B2 * | 2/2007 | Knauerhase et al. | 709/224 |
| 2002/0176391 | A1 * | 11/2002 | Hermann et al. | 370/338 |
| 2005/0091374 | A1 * | 4/2005 | Ganesan et al. | 709/225 |
| 2005/0188104 | A1 * | 8/2005 | Tan et al. | 709/238 |
| 2006/0041636 | A1 * | 2/2006 | Ballinger et al. | 709/218 |
| 2006/0075141 | A1 * | 4/2006 | Boxenhorn | 709/246 |

* cited by examiner

*Primary Examiner*—Liangche A Wang
(74) *Attorney, Agent, or Firm*—Fish & Richardson P.C.

(57) ABSTRACT

A method in a computing device for identifying interfaces related to a service provider includes receiving a call identifier as an explicit parameter in a call or as an implicit parameter contained within input data to request a service provided by the service provider, the call identifier representing a version of the service.

19 Claims, 3 Drawing Sheets

IDENTIFYING INTERFACES RELATED TO A SERVICE

BACKGROUND

The present invention relates to identifying interfaces related to a service provider.

A simple Web service scenario typically includes a Web service provider and a Web service client. The Web service provider implements and exposes some functionality to Web service clients. This functionality is described in an implementation independent format, e.g., using the Web Service Description Language (WSDL). Before a Web service client can access a remote Web service at runtime, the Web service client typically has to get the WSDL file from a Web server, and generate and deploy a local proxy for the remote Web service. Usually a commercial Web service has a long lifetime. Due to, for example, changing requirements, the remote Web service needs to be adjusted from time to time. Often it happens that the remote Web service is changed in an incompatible way without changing the Web service client accordingly at the same time.

There are generally two ways to change Web services incompatibly. The first way is that the syntax of an application programming interface (API) has changed. For example, the number of non-optional input or output parameters, the formal parameter types, or the parameter domain values have changed. The second way is that the semantics of the API has changed. For example, the API implementation expects some database entries (e.g., customer or material entries) as its input data and internally calls some other functionality (not necessary a Web service or an API implementation) to, for example, generate additional documents. If the API implementation performs some security checks, then deleting parts of checks for some security constraints would be semantic changes.

Typically, to handle incompatible changes, the changed Web service implementation is regarded as a new Web service. Web service clients that would like to access the changed Web service need to be updated. Often the old and the new Web service are used in parallel. Old Web service clients can call the old Web service and new Web service clients can call either the new Web service or, deliberately, its older version.

SUMMARY

The document describes methods and apparatus, including computer program products, for identifying interfaces related to a service provider.

In general, in one aspect, the invention features a method for identifying interfaces related to a service provider, the method including, in a computing device, receiving a call identifier as an explicit parameter in a call to request a service provided by the service provider, the call identifier representing a version of the service.

In embodiments, the call identifier can be received as an implicit parameter contained within input data. The version of the service can represent a syntax version and a semantic version. The call can represent implementations of a service, and the version of the service can represent a particular implementation requested from the service provider.

The method can include receiving the call to request the service, and determining the particular implementation requested using the call identifier. The call can represent functionalities and the version of the service can represent a particular functionality requested from the service provider.

The method can include detecting a mismatch between a service client and the service provider using the call identifier. The method can include providing a corrective action in response to the detected mismatch between the service client and the service provider using the call identifier. The corrective action can include converting the call based on the call identifier.

The method can include defining functionality associated with the call identifier in an implementation independent format. The implementation independent format can include a service description in an appropriate language (e.g., Web Service Description Language (WSDL) version 1.1).

The method can include publishing the call identifier to a service registry. The service registry can comply with versions of Universal Description, Discovery, and Integration (UDDI) specifications.

The method can include generating a proxy including the call identifier.

The method can include defining a document including the call identifier, and passing the document in the parameter in the call.

Implementations can realize one or more of the following advantages. API descriptions and API implementations can evolve over time more easily because the techniques described herein provide a facility for dealing with such changes.

Interface changes can include changes in the syntax and semantic of interfaces, because in either case, they will be detectable. Providers can easily identify each version of API descriptions and API implementations. Providers can easily detect if clients are built against valid API descriptions and API implementations. If a call identifier does not match between a client and a provider, the provider can react in any of many different manners (e.g., abort, warn, convert request, inject functions, wrap service, delegate to specific implementation, and so forth).

Clients can easily identify each version of API descriptions and API implementations. Clients can be sure that providers are able to detect mismatches in interface provisioning and usage. Providers can hide different functionality behind a single service interface. In such cases, the call identifier helps to identify which functionality is requested.

Clients can use a single interface signature and therefore the same call code to request different functionalities. In this context, an interface signature is understood as the syntactical part of an interface definition. This mechanism also overcomes the burden of re-publishing a Web service again and again, which is especially annoying in case of minor changes or bug fixes. Therefore the techniques described herein enable a very versatile variant facility. A client calls a specific functionality variant by just choosing a specific call identifier. Providers delegate to specific implementations through change identifier analysis. This additionally allows a type of "handshake protocol" between clients and providers. The handshake protocol can deal with very different topics, e.g., device types, client geographical location and locale, time zones, time-dependent legal requirements (e.g., change of tax rates) and the like. Even load balancing can be handled with a call identifier (e.g., requests with specific call identifier sets are delegated to specific servers). One implementation of the invention provides all of the above advantages.

The details of one or more examples are set forth in the accompanying drawings and the description below. Other features and advantages of the invention are apparent from the following description, and from the claims.

DESCRIPTION OF DRAWINGS

Like reference numbers and designations in the various drawings indicate like elements.

DETAILED DESCRIPTION

Figure 1:
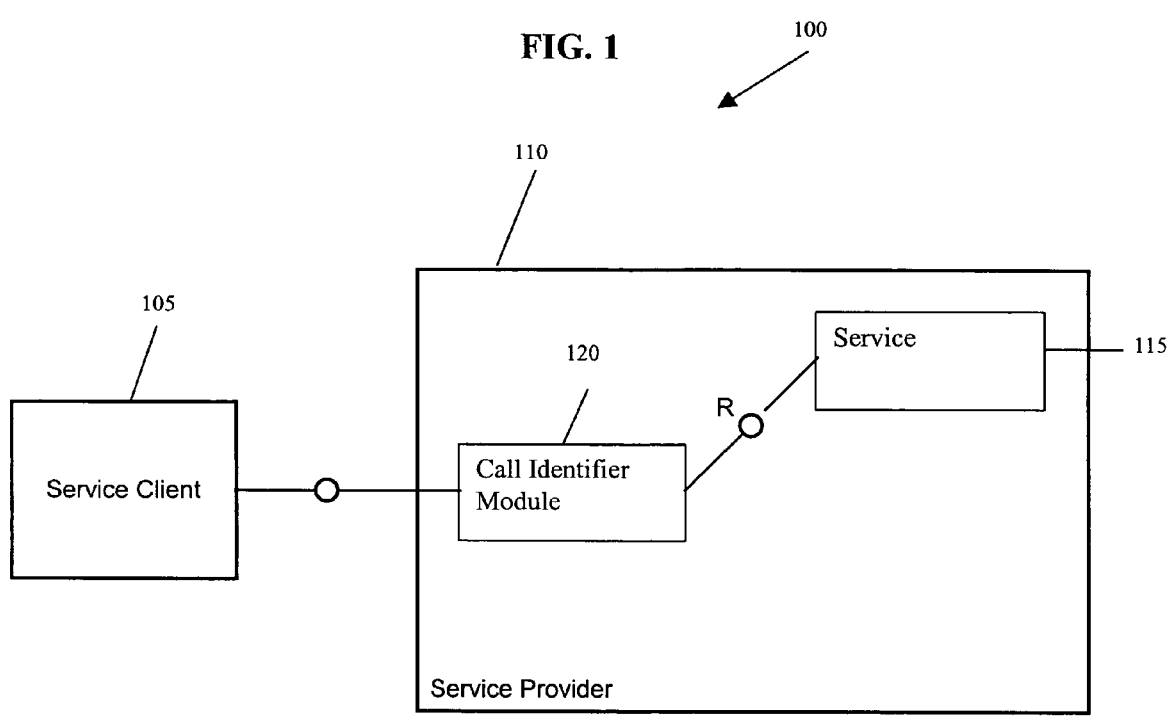
FIG. 1 is a block diagram of an exemplary system for identifying interfaces related to a service provider.

As shown in FIG. 1, an exemplary system 100 can be used in identifying interfaces related to a service provider. The system 100 includes a service client 105 and a service provider 110. The service client 105 is a computer program and/or computing device that requests a service 115 from the service provider 110. The service 115 can be any functionality that the service provider 110 provides, such as searching for particular data in a storage device, modifying particular data in a storage device, performing a specific calculation using particular data, accessing a backend device, and so forth.

To make a request for the service 115, the service client 105 transmits a call to the service provider 110. The call has a particular signature that is defined by the service provider 110. The signature includes one or more parameters needed to successfully invoke the service 115 and obtain the desired results. For example, the service 115 can be a service that provides details of orders that are stored in an order database. To obtain an order, the service client 105 has to provide to the service provider 110 the order number and the customer number. A call to request this service can be, for example, "getOrder(callIdentifier, orderNumber, customerNumber)."

As illustrated in this example, the call includes "callIdentifier" as one of its parameters. The call identifier represents a version of the service 115 to which the call corresponds. The call identifier is defined when the service is established. By using a call identifier within the call itself, a call identifier module 120 can determine a version of the service 115 to which the call corresponds. This means that the call identifier module 120 can determine both syntax and semantics to which the call corresponds. The call identifier can be, for example, a hash value or a Universal Unique Identifier (UUID). Items associated with the call (e.g., name of API, name of the service 115, parameters of the call, and so forth) can be used to generate a UUID.

For example, the call identifier "1234" was defined when the customer number of the "getOrder" call was represented by a ten digit number, where the first three digits represented a company, the next three digits represented a division of the company, and the last four digits represented a building to which the order was being delivered. The call identifier "1235" was defined when the customer number format of the "getOrder" call was changed to be the first four digits represented a company, the next three digits represented a division of the company, and the last three digits represented a building to which the order was being delivered. With this simple example, it can be seen that even though both formats use ten digits, the call identifier advantageously enables the call identifier module 120 to identify what format the customer number is in and whether that particular call is compatible with the current version of the service 115 provided by the service provider 110.

Figure 2:
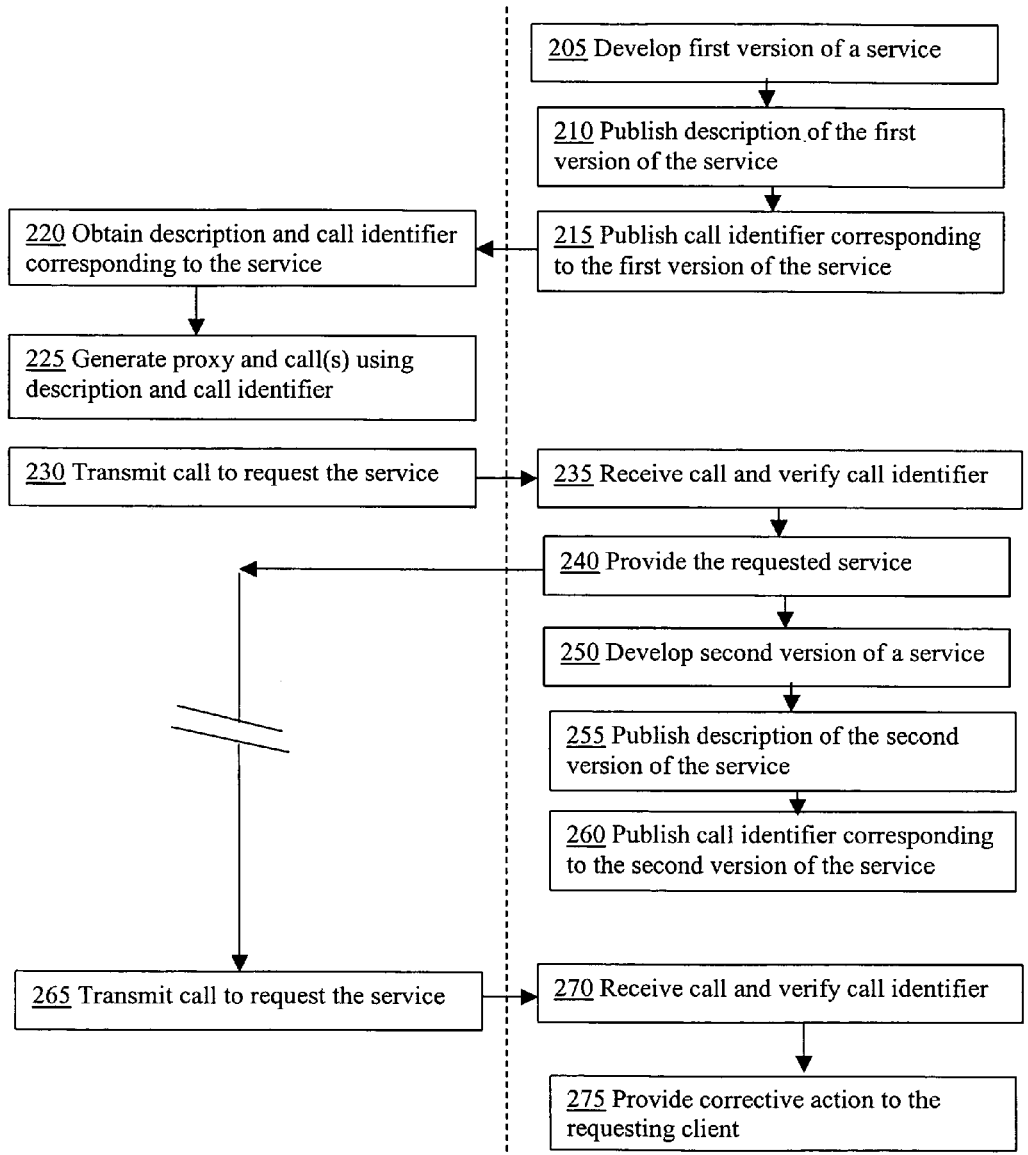
FIG. 2 is a flow diagram of a system for identifying interfaces related to a service provider.

As shown in FIG. 2, a process 200 for identifying interfaces related to a service provider is illustrated. In one particular example, the description of the process 200 includes components illustrated by system 100. A software developer implements (205) a first version of the service 115. To inform unit 105 (the service client) about the Web services exposed by the service provider 110, each Web service is described in an implementation independent format, such as in the Web Service Description Language (WSDL). In addition, the service provider 110 publishes (210) that Web service description, e.g., a WSDL document, in a service registry. The service registry can, for example, comply with the Universal Description, Discovery, and Integration (UDDI) specification. The service provider 110 also publishes (215) the call identifier that corresponds to the version of the service 115 that was developed (205).

Using the WSDL description, the service client 105 obtains (220) the published description and call identifier (e.g., from a registry). Using the description and call identifier, the service client 105 can generate (225) a proxy that includes a call to request the service 115. When the service client 105 wants to request the service 115, the service client 115 transmits (230) the call to the service provider 110. As described above, the call has a call identifier as one of its parameters. The service provider 110 receives the call and verifies (235) the call identifier against the version of the service 115. For example, the call identifier module 120 can read a table that defines the call identifier for the current version of service 115 to be "1234." If the call identifier in the call matches this table entry, then the call identifier module 120 has verified (235) that the call is appropriate for the current version of the service 115 and transmits the call to the service 115 for processing. In this portion of process 200, the call was generated using the first version of the service 115 and that first version is still in use, so the call identifier does match and the service provider 110 provides (240) the requested service.

Later, for any of many reasons, a second version of the service 115 is developed (250). As described above, the description and the call identifier for the second version of the service 115 are published (255, 260). The service client 105 is unaware that a second version of the service 115 has been published. In many cases, the service provider 110 does not know the identity of its clients and cannot notify its clients of service API changes or service implementation changes. Also, the API descriptions, e.g., WSDL documents, focus on syntactical descriptions. They do not describe the semantics of the API or the behavior of the API implementation and often cannot express changes in semantics.

The service client 105, unaware of the change, transmits (265) another call to the service provider 110 to request the service 115 again. Because the service client 105 is unaware of the new second version of the service 115, the call identifier used is the call identifier corresponding to the first version of the service 115 (e.g., "1234"). The service provider 110 receives the call and verifies (270) the call identifier. In this case, the call identifier module 120 reads that the call identifier in the call is "1234" but the call identifier for the second version should be "1235." Upon detecting this mismatch between the service client 105 and the service provider 110, the service provider 110 provides (275) a corrective action to the service client 105. The corrective action can include, for example, aborting the request, transmitting a warning, converting the request and injecting functions as needed, wrapping the service, delegating the request to a specific implementation, and so forth.

For example, with the customer number format example described above, in the first version with the call identifier "1234," the first three digits represented a company, the next three digits represented a division of the company, and the last four digits represented a building to which the order was being delivered. In the second version with the call identifier "1235," the first four digits represented a company, the next three digits represented a division of the company, and the last three digits represented a building to which the order was being delivered. Using this example with process 200, when the second request is received (270), the format of the customer number is ten digits. Without anything more (e.g., without a call identifier), the second version of the service 115 would take that ten digit number and process it, even though the service client 105 was formatting the number according to the first version of the service (e.g., only the first three digits represented the company). Without the call identifier, the service client 105 would receive a different result than expected, with no explanation of the error.

With the call identifier (e.g., "1234"), the call identifier module 120 can determine (270) that the call is based on the first version of the service 115. Because the service 115 is at a second version and there is a mismatch, the call identifier module 120 can determine the corrective action to take, and if applicable, provide (275) the corrective action to the service client 105. In one example, the call identifier module 120 can initiate a reply to the call that delivers a message to the service client 105 that the service 115 has changed and that an update to the service client is necessary to continue to use the service 115. In another example where a lookup table is used to track the associations of service versions to call identifiers, the call identifier module 120 can determine the corrective action by using the same lookup table as the version numbers. Such a lookup table could include a row for each version number, with one or more columns representing prioritized corrective action instructions that the call identifier module 120 can process.

The call identifier module 120 can convert the call for the new version of the service 115. For the ten digit customer number example, the call identifier module 120 or the service itself 115 can use a table to convert the ten digit customer number of the first version to the second version, if the changes are compatible. If not compatible, the service provider 110 can transmit a message to the service client 105 that the versions are not compatible. If the versions are not compatible, the call identifier module 120 can also initiate a download to the service client 105 with the information needed to upgrade the service client 105. For example, the service provider 110 can transmit the WSDL description and the call identifier associated with the second version of the service 115 to the service client 105.

Figure 3:
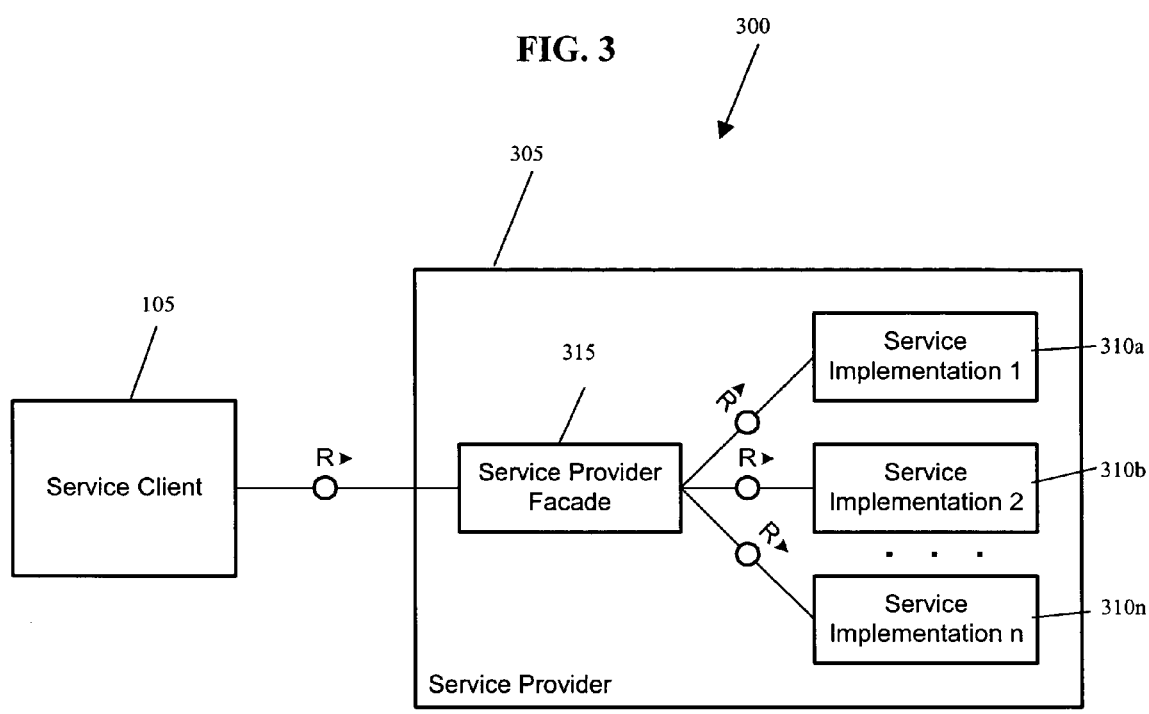
FIG. 3 is a block diagram of an exemplary system for providing multiple service implementations through a single service provider interface.

The examples above describe a different version of the service 115 due to a change that is implemented subsequent to publishing information about the service 115. Different versions of a service are not limited, however, to subsequent changes. As shown in FIG. 3, an exemplary system 300 is illustrated in which a service provider 305 provides n different parallel implementations 310a, 315b, ... 315n, referred to generally as the service 310. When the service client 105 wants to select a particular service implementation (e.g., 310a, 310b, ... or 310n), the service client 105 uses a call identifier that corresponds to that particular service implementation. For example, a call identifier "1236" can correspond to the first service implementation 310a, a call identifier "1237" can correspond to the second service implementation 310b, and a call identifier "1249" can correspond to the nth service implementation 310n. In such an example, a service provider facade module 315 can process all incoming calls and direct each call to the appropriate service implementation 310a, 310b, ... 310n based on the call identifier. In one example, the service provider facade module 315 can use a lookup table to determine which call identifier corresponds to which service implementation 310a, 310b, ... 310n.

In a particular example, the service 310 can provide an optimization of data. In this example, each service implementation 310a, 310b, ... 310n provides a different optimization algorithm to optimize the data. Depending on the type of problem, the service client 105 can call a particular optimization algorithm best suited for that problem using the respective call identifier for the desired service implementation. In other examples, the different service implementations 310a, 310b, ... 310n can represent different functionalities all together. In other words, different services are provided by different service implementations. In such examples, the call identifier is used to identify which functionality the service client 105 is requesting. For example, instead of having different calls for different methods, there can be one universal call, and the method is selected and identified using the call identifier.

The call identifier can be used for static proxies (e.g., proxies developed or generated at development time), for dynamic proxies (e.g., proxies generated at run time), and for calling the service without any proxy (e.g., using "raw" or low-level functionalities). The call identifier can have some attributes, e.g., predecessor-successor relationships and shared closures thereof (versioning), and tracking of version status (active, outdated, and so forth). Changes of these attributes may be published in registries, along with the call identifier. The examples described above are applicable to both remote calls and to local calls (e.g., calls between or within the same address space). The call identifier can be used for many types of communications (e.g., RPC/RFC ) and for different kinds of messaging.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., a field programmable gate array (FPGA) or an application specific integrated circuit (ASIC). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method for identifying interfaces related to a service provider, the method comprising:
    publishing a description of a service provided by the service provider in a service registry that complies with Universal Description, Discovery, and Integration (UDDI) specifications and that can be selectively accessed by a remote service client; and
    receiving a call identifier as an explicit parameter in a call to request a service provided by the service provider, the call being generated at the remote service client and including functionality described in a Web Service Description Language (WSDL), the call identifier representing a version of the service provided by the service provider in accordance with a most recent access of the service registry by the service client.

2. The method of claim 1 wherein the version of the service is implicit in the call identifier contained within the input data.

3. The method of claim 1 wherein the version of the service represents a syntax version and a semantic version.

4. The method of claim 1 wherein the call represents a plurality of implementations of a service, and the version of the service represents a particular implementation requested from the service provider.

5. The method of claim 4 further comprising:
    receiving the call to request the service; and
    determining the particular implementation requested using the call identifier.

6. The method of claim 1 wherein the call represents a plurality of functionalities and the version of the service represents a particular functionality requested from the service provider.

7. The method of claim 1 further comprising detecting a mismatch between a service client and the service provider using the call identifier.

8. The method of claim 7 further comprising providing a corrective action in response to the detected mismatch between the service client and the service provider using the call identifier.

9. The method of claim 8 wherein the corrective action comprises converting the call based on the call identifier.

10. The method of claim 1 further comprising defining the functionality associated with the call identifier in an implementation independent format.

11. The method of claim 1 further comprising generating a proxy comprising the call identifier.

12. The method of claim 1 further comprising:
    defining a file comprising the call identifier; and
    passing the file in the parameter in the call.

13. A computer program product, tangibly embodied in a machine readable storage device, for identifying interfaces related to a service provider, the computer program product including instructions being operable to cause data processing apparatus to:
    publish a description of a service provided by the service provider in a service registry that complies with Universal Description, Discovery, and Integration (UDDI) specifications and that can be selectively accessed by a remote service client; and
    use a call identifier as an explicit parameter in a call to the service provider that is generated at the remote service client, that requests a service provided by the service provider and that includes functionality described in a Web Service Description Language (WSDL), the call identifier representing a version of a service provided by the service provider in accordance with a most recent access of the service registry by the service client.

14. The computer program product of claim 13 wherein the version of the service is implicit in the call identifier contained within the input data.

15. The computer program product of claim 13 wherein the version of the service represents a syntax version and a semantic version.

16. The computer program product of claim 13 wherein the call represents a plurality of implementations of a service, and the version of the service represents a particular implementation requested from the service provider.

17. A system for identifying interfaces related to a service provider, the system comprising a computing device configured to publish a description of a service provided by the service provider in a service registry that complies with Universal Description, Discovery, and Integration (UDDI) specifications and that can be selectively accessed by a remote service client, and use a call identifier as a parameter in a call to the service provider that is generated at the remote service client, that requests a service provided by the service provider, and that includes functionality described in a Web Service Description Language (WSDL), the call identifier representing a version of a service provided by the service provider in accordance with a most recent access of the service registry by the service client.

18. The system of claim 17 wherein the version of the service represents a syntax version and a semantic version.

19. A method for identifying interfaces related to a service provider, the method comprising:

publishing a description of a service provided by the service provider in a service registry that complies with Universal Description, Discovery, and Integration (UDDI) specifications and that can be selectively accessed by a remote service client;

receiving a call identifier as an explicit parameter in a call that is generated at the remote service client, that requests a service provided by the service provider, and that includes functionality described in a Web Service Description Language (WSDL), the call identifier representing a version of the service provided by the service provider in accordance with a most recent access of the service registry by the remote service client;

verifying the call identifier; and initiating a corrective action if the call identifier does not correspond to a current version of the service provided by the service provider.

* * * * *